3,764,449
METHOD OF MAKING A POLYIMIDE AND LAMINATED PRODUCT MADE THEREFROM
Robert L. Copeland and Samuel A. Moorefield, Marion, Va., and David R. Beeler and Vance A. Chase, Poway, Calif.; said Copeland and said Moorefield assignors to Brunswick Corporation, Chicago, Ill.
No Drawing. Filed Oct. 6, 1969, Ser. No. 13,915
Int. Cl. C08j 1/14
U.S. Cl. 161—88
8 Claims

ABSTRACT OF THE DISCLOSURE

A preformed polyimide having a void content of less than 5% which can be textile reinforced and which has great strength, even when exposed to temperatures upward of 500° F. A method for producing such preformed polyimide by carefully controlling the imidization.

BACKGROUND OF THE INVENTION

The rapid advances in technology in recent years has given rise to a need for materials which possess high strength and which retain this high strength at high temperatures, e.g. upwards of 500° F. In addition, with the advent of supersonic aircraft and missiles, the need for dielectric walls (e.g. radomes) which will withstand high temperatures without substantial loss of strength has arisen.

Materials useful in producing radomes should possess other minimum characteristics. Among those which can be mentioned are high strength, e.g. a flexural strength of 80,000 p.s.i., efficient electromagnetic radiation characteristics, e.g., a loss tangent of less than 0.02, and light-weightness, e.g. approximately 130 pounds per cubic foot or less.

Heretofore, radomes possessing certain of the minimum characteristics described above have been made from reinforced polyesters and epoxys in both laminate and honeycomb-laminate structures and have been used heretofore on older aircraft but have not been found to be satisfactory on the newer supersonic aircraft and missiles. The primary reason for this deficiency in the prior material for radomes is that the new aircraft and missiles produce temperatures on the order of 400° F. to 1,000° F. and the prior art compositions do not have sufficient heat resistance and, in addition, lose their strength when exposed to such high temperatures.

It is thus a desideratum in the art to have a material which can be preformed, which is light in weight, and which will maintain good strength characteristics at high temperatures for long periods of time. If the end use is for radomes, the material should, in addition, have good electro-magnetic radiation characteristics.

SUMMARY OF THE INVENTION

The present invention is based upon the surprising discovery that preformed polyimides having a void content of less than 5% possess the requisite characteristics for use in radomes on supersonic aircraft and space missiles. The polyimides of this invention are characterized by having high strength (at temperatures above 500° F.), high heat resistance, low loss tangent value, substantially uniform dielectric constant, and can be made to have a specific gravity of under 2.

As noted supra, the polyimides of this invention possess properties which make them ideal for constructing dielectric walls which are to be utilized at high temperatures (radomes for supersonic aircraft). In addition, because of the characteristics of the polyimides of this invention they can be utilized for structural uses such as turbine blades, engine shrouds, heat shields, rotor blades and acoustical panels.

In order to provide the necessary low void content of the present invention, which is necessary in order to obtain the properties set forth above, the curing of the polyimide resin is controlled so as to remove the various vapors formed during the reaction (primarily water) as well as solvents and allow the polyimide to flow in such a manner that substantially all the voids formed by the removal of the vapors are filled with the polyimide before the polyimide is finally set.

It is thus an object of the present invention to embody a preformed, thermally set, finally cured polyimide resin which has high strength characteristics at temperatures above 500° F.

It is another object to provide and embody a polyimide resin having a void content of less than 5% which can be utilized as a static or dynamic structure in either a cast or reinforced composition.

A further object of the present invention is to provide a high heat resistant reinforced polyimide composite which has a void content of less than 5% and can maintain its strength characteristics and properties at temperatures in excess of 500° F.

It is still a further object to produce reinforced polyimide laminated composite which can be utilized for the skin of radomes.

It is still a further object of the present invention to embody a method for producing a thermally set, finally cured polyimide resin having a void content of less than 5%.

Further objects of the present invention will be readily apparent from the following detailed description.

DESCRIPTION OF THE PREFERRED EMBODIMENTS

As noted above, in any composition which is to be utilized in a radome structure, particularly as a skin, it is necessary to have certain physical and electrical properties. We have discovered that the low void polyimide of the invention, particularly when reinforced with fabrics, provide the desired dielectric and loss tangent properties.

A polyimide structure may be produced having a low void content (less than 5%) wherein the flexural strength is at least 50,000 p.s.i. at 600° F. even after being heated for about 1000 hours. The reinforced polyimide of this invention, particularly the reinforced polyimide, is ideally suited for use as a covering for an electromagnetic radiation source wherein the skin formed from the polyimide composition of this invention has substantially the same dielectric values as the core.

A polyimide having such a low void content is made by carefully controlling the imidization reaction in such a manner that the water resulting from the reaction as well as the solvents utilized for disolving the polymer precursors are allowed to escape but the voids formed from the escape of the water and solvents are refilled by the resin prior to final setting of the resin into a hard mass.

Generally speaking, polyimides are made by starting with a diamine and a dianhydride which are dissolved in a suitable solvent. Preferably, the dianhydride is aromatic and both the dianhydride and the diamine are dissolved in a suitable solvent. In order to have a polyimide having a very low void content it is usually desirable that the dianhydride be aromatic such as pyromellitic dianhydride. The polyimide precursors can be represented by the following general chemical formulae:

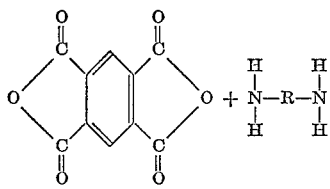

in which R is hydrocarbon and preferably either aliphatic or aromatic.

It should be emphasized that the starting materials for preparing polyimides are known in the art and that the present invention is not predicated thereon. Generally speaking, any of the known starting precursors (a dianhydride and a diamine) can be utilized provided that the imidization reaction is carefully controlled as set forth in more detail infra.

At the present time there are various commercial products on the open market which contain a diamine, a dianhydride and a solvent which are useful in the present invention. One of these is sold under the trademark Skybond 703 which is a solution of a diamine, a dianhydride in N-methylpyrrolidone (NMP).

When utilizing such commercial mixtures and when it is desired to produce a low void polyimide which is reinforced it is usually preferable to mechanically mix with the resin solution a thixotropic agent such as $SiO_2$ (e.g. a material sold under the name Cab-O-Sil). The thus prepared solution is then applied to a fiber material such as fabric. The fiber material is preferably made from materials such as glass fiber, but may also be asbestos, graphite, boron, metal or similar reinforcing materials or a combination of any of these materials. It is to be understood that as used herein the term reinforced layer includes one or more layers of fabric or other fiber systems impregnated with the resin material and initially processed. A laminate structure is defined to mean one or more such layers. The impregnated fabric is thereafter dried at room temperature for approximately 12 hours but in any case, long enough to insure the adequate solvent evaporation. At this stage the impregnated fabric is referred to as a prepreg. Thereafter the prepreg is heated in an oven and preferably for at least 1½ hours at the 250° F. Desirably the prepreg is heated in an air circulation oven. The actual temperatures and time conditions for heating, the prepreg may vary over a range of anywhere from 70 hours at 150° F. to 1½ hours at 250° F. Subsequently these prepreg sheets are combined in a laminated composite of the desired thickness. The composite is then placed in a vacuum bag (such as that which is used in the industry) and the bag is thereafter evacuated over the range being from 21 to 29 inches of mercury. The then bagged composite is placed in an oven preferably in an air circulating autoclave which is pressurized, for a period of from ¾ of an hour to 1 hour at a pressure ranging from 75 p.s.i.g. to 250 p.s.i.g. While the oven is being pressurized, the temperature therein is raised to about 275° F to 375° F. to control the imidization of the resin. The oven is held at heat for approximately 2 hours plus or minus 15 minutes. The bagged composite is cooled to a temperature of 150° F. with a minimum cooling time of one hour, there being no maximum cooling time. The bagged composite is removed from the oven and the vacuum bag stripped from the composite. The laminated composite is placed in an oven, preferably in an air circulating oven and the temperature is raised to about 350° F. in not less than one half hour. It is preferable that the temperature rise take place over a one to two hour period. The temperature is then raised in the oven from about 50 F. ° to 100 F. ° every 24 hours. The time period can be longer or shorter depending upon the thickness thereof. These incremental temperature rises take place until the laminated composite has been held for at least 24 hours anywhere between 600° F. and 700° F. The composite is then cooled in the oven. The time for cooling is a function of the oven size however, the composite generally should not be cooled in less than one hour. Since ovens, heaters, air circulation autoclaves, etc., come in all sizes, the heating and cooling times can vary. Therefore, unless otherwise specified the times given can be extended any desired period.

In the reaction mechanism provided, prior to the first heating step (the 1½ hours at 250° F. to 70 hours at 150° F. range) substantially no imidization has taken place. During this first heating step it is believed that the mixed resin solution is substantially converted to an intermediate polyamic acid which is represented as:

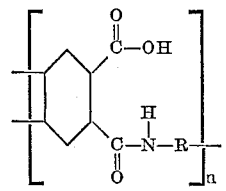

The next major phase of the processing occurs during the time that the vacuum bagged composite is heated under pressure to the 350° F. range, held there for a period of time and then slowly cooled. During this phase it is believed that the hydroxyl radical bonded to the carbon and the hydrogen bonded to the nitrogen combine to form water which is thereinafter released. It is also believed that concomitant therewith substantial imidization takes place and concurrently the resin goes through a glass transition stage (softening) permitting the hot $H_2O$ (probably in the form of steam) to be released by rising through the reinforced laminate composite with the vacuum assisting to remove the water vapor. The paths formed by the exiting water vapor are refilled by the softened resin material thereby closing the voids so that the composite is substantially void free. In addition it is also believed that ring closure takes place to form long molecular chains. The small amount $SiO_2$ is used as a flow control agent to maintain adherence of the resin solution to the fabric during the heating cycles.

Another method of making a reinforced low void polyimide is when a fabric such as fiber glass is impregnated with a polyamic acid. A resin solution of a diamine, a dianhydride and a solvent, such as NMP, 100 parts by weight, and $SiO_2$ (such as Cab-O-Sil), 2 parts by weight are mechanically mixed together. The mixed resin solution is pre-reacted at temperatures of about 140° F. to 160° F. until a viscosity of approximately 75,000 to 100,000 centipoise (cps.) is achieved. The viscous resin is diluted with a convenient solvent such as dimethylformamide to change the viscosity to approximately 27,000 cps. to 33,000 cps. while the viscous resin is still at the above elevated temperature. While remaining at approximately 140° F. to 160° F. a fabric such as fiber glass is impregnated with the dilute resin solution. The impregnated fabric is heated to approximately 240° F. to 260° F. and held until the desired volatile content is achieved. The time required to achieve the desired volatile content is from 17 minutes to 23 minutes. The resin impregnated fabric is now ready to be laminated into a reinforced composite, if desired, or further processed as is. From this stage on, the processing is similar to the first process described hereinabove for making a low void reinforced polyimide laminate composite. As in the process referred to hereinabove, there are variations contemplated which will be apparent to those skilled in the art.

It has been found that it is not necessary that a fabric be impregnated in order to form a low void polyimide. This type of cast or castable low void polyimide can be used for high temperature molded plastic items such as, insulators turbine parts, noise suppressors, and the like. However, the processing steps are not the same as for the reinforced composite low void polyimide.

The following is one general procedure used to make a cast low void polyimide that is not used with any fabric material. Mechanically mixed together are 100 parts by weight of a pre-polymer solution of a dianhydride, a di-amine and a solvent such as N-methylpyrrolidone and 40 parts by weight of an additional solvent to form a dilute mixed resin solution. This dilute mixed resin solution is placed in a mold. The mold may be of any shape to produce the desired product. The container is heated to approximately 125° F. and held at heat for at least 200 hours. The specific length of time depends on the thickness of the piece. It has been found that approximately 200 hours is sufficient for a piece ⅛ inch thick. For thicker parts the time held at heat will be longer. However, the time required must be sufficient for the piece in the mold to become solid. The heat is then raised approximately 25 F.° approximately every 4 hours. Again, longer times are required for the thicker pieces. These incremental raises take place until the piece has been held at heat anywhere between 300° F. and 350° F. The heat is then raised approximately 50 F.° every 15 hours until a temperature of at least 600° F. is achieved. However, if the piece will be used at a temperature higher than 600° F. the piece may be raised to that temperature. The piece is then slowly cooled to room temperature allowing at least a minimum of one hour; however, a longer time will be satisfactory.

Again the heating and cooling times may vary with the equipment used. Therefore, unless otherwise specified the times given can be xtended any desired period.

The low void cast polyimide has superior strength characteristics when compared to expoxies, polyesters, etc. However, cast low void polyimide material have substantially the same heat resistant characteristics as the low void reinforced laminate polyimide and therefore maintains very good strength at temperatures over 600° F. By casting the material it is possible to fashion many castable items such as turbine blades, jet engine intake parts and the like.

Low void reinforced polyimide laminates have exhibited good structural strength and high heat resistance in addition to being able to provide a uniform and suitable dielectric with a low loss tangent for use as a dielectric wall. A low loss tangent is a characteristic of a material structure that permits the efficient transmission of radar therethrough. A comparison of the laminated polyimide with other materials currently being used for radomes is shown in Table I.

TABLE I

| | Polyester [1] | Epoxy [1] | Polymide with 15% void content | Low void [2] polyimide [1] |
|---|---|---|---|---|
| Flexural strength at 70° F., p.s.i. | 70,000 | 90,000 | 45,000 | 80,000 |
| Flexural strength at 600° F., p.s.i | 1,000 | 1,000 | 33,000 | 60,000 |
| Flexural strength at 800° F. for ½ hour, p.s.i. | 1,000 | 1,000 | 1,000 | 35,000 |
| Weight, lb./f.³ | 130 | 130 | | 130 |
| Loss tangent | .011 | .016 | | .014 |
| Dielectric constant | 4 | 4.2 | | 4.2 |

[1] Materials are fiberglass reinforced.
[2] Less than 5% void content.

The low void content of the cast or laminated polyimide may be determined by either of two methods. In one method samples of the polyimide are cut and examined under a microscope with the size of the voids optically determined and void content calculated therefrom. The other method is to measure accurately each component used to make the cast or reinforced laminated polyimide, calculate the 100% theoretical weight minus the weight loss from the solvent and subtract the weight of the final polyimide from the calculated weight. The difference in weight can then be used to calculate the void percentage.

The following two examples are processes to produce a low void reinforced laminate polyimide material and are intended only to illustrate the invention and not limit it in any way.

Example I (I-A) Two parts by weight $SiO_2$ (silicon dioxide) with 100 parts by weight of the pre-polymer solution typically prepared from a dianhydride, a diamine, and a solvent, NMP, was combined at room temperature in a mechanical mixer until a mixed resin solution was formed.

(I-B) A fiber glass fabric was impregnated with the mixed resin solution.

(I-C) The impregnated fabric was dried at room temperature for 24 hours to allow the solvent to evaporate and produce the prepreg.

(I-D) The prepreg was placed in an air circulation oven for 1½ hours at 250° F.

(I-E) A plurality of prepreg sheets were then laminated to form a composite laminate structure of about ⅛ inch thick.

(I-F) The composite was enclosed within a vacuum bag and its contents evacuated to about 26 inches of mercury.

(I-G) The evacuated bag with the composite therein was placed in an autoclave which was at room temperature.

(I-H) The autoclave was pressurized over a period of one hour to 100 p.s.i.g. while the temperature in the autoclave was raised to and maintained at 350° F. for 2 hours.

(I-I) The bag and contents were cooled under 100 p.s.i.g. pressure to a maximum temperature of 150° F. in autoclave requiring about 1½ hours to cool from 350° F. to 150° F.

(I-J) The bag was removed from the autoclave, the vacuum removed and the bag stripped from the laminate composite.

(I-K) (Post-Curing) The composite laminate was heated in an air circulating oven by increasing the temperature from ambient to 350° F. during a one hour period, then raising the temperature in increments of 50 F.° and holding the composite laminate for 24 hours at each temperature increase through 600° F.

(I-L) The structure was cooled and then removed from the oven.

Example II (II-A) Step I-A of Example I was followed.

(II-B) The resin solution was pre-reacted at 150° F. until the viscosity of the resin (at 150° F.) was approximately 100,000 centipoise (cps).

(II-C) The viscous resin was diluted with dimethylformamide to change the viscosity to approximately 30,000 cps. (at 150° F.).

(II-D) A fiber glass fabric was impregnated with the diluted resin solution while the resin temperature is maintained at 150° F.

(II-E) The impregnated material was heated to 250° F. and held at heat for 21 minutes. The remaining steps are the same as Example I Steps I-E through I-L.

The polyimide materials of Samples I and II were thermally set composite structures after the final curing step. The materials made were tested by the method hereinbefore mentioned and found to have a void content of less than 5%. These materials also exhibited substantially the same strength properties as the Low Void Polyimide listed in Table I. In addition, these samples had a loss tangent value of .010 at the X-Band frequency on the electromagnetic radiation scale and a dielectric constant of 4.4.

The following is one example of a process to produce cast low void polyimide material and is intended only to illustrate the invention and not to limit it in any way.

Example III (III–A) Mechanically mixed together were 100 parts by weight of the pre-polymer solution prepared from a dianhydride, a diamine and a solvent, NMP, with 40 parts by weight of an additional amount of solvent, NMP, at room temperature in a mechanical mixer to form a thoroughly mixed diluted resin solution.

(III–B) The diluted resin solution was placed in a mold.

(III–C) The mold was heated in an oven at 125° F. for 200 hours. The temperature was raised in 25 F.° increments every 4 hours from 125° F. through 300° F.

(III–D) The heat was then increased 50 F.° every 15 hours until the mold was held at 600° F. for 15 hours. The mold was cooled from 600° F. to room temperature in 2 hours.

A cast ⅛ inch thick piece composition of matter comprising a thermally set and finally cured polyimide resin made by the method of Example III exhibited a void content of less than 5%. The void content was determined by the method mentioned hereinabove. This cast low void polyimide material had a 3.1 dielectric constant, a .006 loss tangent value, 18,000 p.s.i. compressive strength and 13,000 p.s.i. tensile strength. The cast material exhibited excellent characteristics for a high arc insulator for use in a high temperature environment.

A reinforced laminated low void polyimide can be formed to fit a mandrel or die during the processing stage and accordingly will provide all the characteristics needed for a suitable radome. Therefore, a low void reinforced polyimide laminate structure can be used as a radome which can be designed to any desired electrical criteria.

The low void reinforced polyimide products can also be made into dynamic structures such as turbine blades and rotor blades and can be used for substantially static structures such as acoustical panels, engine shroud, etc. The low void reinforced polyimide can maintain substantially full strength at 500° F. operating temperatures. However, it has been found that in order to satisfy the structural and lightweight requirements for large radomes it may be necessary to use this low void reinforced laminate polyimide as the interior and exterior skins of a radome structure wherein two or more skins are adjacent but spaced apart by lighter density materials.

We claim:

1. A thermally set laminate composite structure comprising a plurality of textile reinforcing layers impregnated by a finally cured non-foamed polyimide material having a void content of less than 5% and wherein the reinforcing layers are additionally spaced apart by layers of the polyimide material.

2. The structure of claim 1 wherein said textile is a yarn.

3. The structure of claim 1 wherein said textile is a fabric.

4. The structure of claim 1 wherein said textile material is selected from the group consisting essentially of glass, metal, asbestos and graphite.

5. A non-foamed thermally set cast structural composition of matter having a minimum thickness greater than ⅛th inch comprising a finally cured polyimide material having a void content of less than 5%.

6. A method of making a thermal setting polyimide having a void content of less than 5% comprising the steps of:
(a) evacuating a bag containing a polyamic acid precursor for polyimide resin; and
(b) heating the bagged resin to a temperature in the order of about 275° F. to 375° F. while under a pressure of 75 p.s.i.g. to 250 p.s.i.g. thereby controlling the imidization of the pre-polymer polyimide so to allow the water reaction product to escape and causing substantially all the paths formed by the exiting water to be refilled by resin material prior to the final setting stage.

7. The method of claim 6 wherein said polyimide is postcured and then cooled to room temperature.

8. The method of claim 6 wherein said resin impregnates a textile fabric prior to imidization.

References Cited

UNITED STATES PATENTS

| | | | |
|---|---|---|---|
| 3,179,632 | 4/1965 | Hendrix | 260—78 T F |
| 3,179,634 | 4/1965 | Edwards | 260—78 T F |
| 3,249,561 | 5/1966 | Hendrix | 260—2.5 N |
| 3,483,144 | 12/1969 | Lavin et al. | 260—2.5 N |
| 3,511,790 | 5/1970 | DeBrunner et al. | 260—2.5 N |
| 3,520,837 | 7/1970 | Wilson | 260—2.5 N |

OTHER REFERENCES

"Polyamides," Adrova et al., Jerusalem, 1969, pp. 12 and 146.

"New Linear Polymers," by Lee et al., pp. 217–220; copyright November 1967.

SAMUEL H. BLECH, Primary Examiner

M. FOELAK, Assistant Examiner

U.S. Cl. X.R.

161—93, 227; 260—37 N, 78 TF, 205 N